United States Patent
Wuidart

(10) Patent No.: US 8,395,485 B2
(45) Date of Patent: Mar. 12, 2013

(54) INDUCTIVE EVALUATION OF THE COUPLING FACTOR OF AN ELECTROMAGNETIC TRANSPONDER

(75) Inventor: Luc Wuidart, Pourrieres (FR)

(73) Assignee: STMicroelectronics (Rousset) SAS, Roussey (FR)

( * ) Notice: Subject to any disclaimer, the term of this patent is extended or adjusted under 35 U.S.C. 154(b) by 202 days.

(21) Appl. No.: 12/815,681

(22) Filed: Jun. 15, 2010

(65) Prior Publication Data

US 2010/0321164 A1    Dec. 23, 2010

(30) Foreign Application Priority Data

Jun. 19, 2009 (FR) .................................... 09 54147

(51) Int. Cl.
- *H04Q 5/22* (2006.01)
- *G08B 13/14* (2006.01)
- *H04B 5/00* (2006.01)
- *H04B 1/04* (2006.01)
- *H01Q 11/12* (2006.01)

(52) U.S. Cl. ................. 340/10.4; 340/572.4; 340/572.5; 455/41.1; 455/125

(58) Field of Classification Search ........ 340/10.1–10.4, 340/572, 636.17, 636.2, 655, 662, 664; 455/41.1, 455/125

See application file for complete search history.

(56) References Cited

U.S. PATENT DOCUMENTS

| | | | | |
|---|---|---|---|---|
| 5,680,106 A * | 10/1997 | Schrott et al. | ............ | 340/10.33 |
| 5,703,573 A | 12/1997 | Fujimoto et al. | | |
| 6,473,028 B1 * | 10/2002 | Luc | ............... | 342/118 |
| 6,480,110 B2 * | 11/2002 | Lee et al. | ................... | 340/572.5 |
| 6,547,149 B1 * | 4/2003 | Wuidart et al. | ............... | 235/492 |
| 6,650,229 B1 | 11/2003 | Wuidart et al. | | |
| 6,963,729 B2 * | 11/2005 | Uozumi | .......................... | 455/42 |
| 7,049,935 B1 | 5/2006 | Wuidart et al. | | |
| 7,049,936 B2 * | 5/2006 | Wuidart | ....................... | 340/10.4 |
| 7,199,652 B2 * | 4/2007 | Morimoto et al. | ............ | 327/560 |
| 2003/0071717 A1 | 4/2003 | Hagl et al. | | |
| 2005/0001609 A1 | 1/2005 | Cuylen | | |
| 2005/0231328 A1 | 10/2005 | Castle et al. | | |
| 2008/0136643 A1 | 6/2008 | Yeo et al. | | |
| 2008/0204206 A1 | 8/2008 | Frohler | | |
| 2010/0123536 A1 * | 5/2010 | Lu et al. | ........................ | 336/105 |
| 2010/0321164 A1 * | 12/2010 | Wuidart | ...................... | 340/10.4 |

FOREIGN PATENT DOCUMENTS

EP    1071038 A1    1/2001
FR    2757952 A1    7/1998

OTHER PUBLICATIONS

French Search Report dated Feb. 9, 2010 from corresponding French Application No. 09/54147.
French Search Report dated Feb. 3, 2010 from related French Application No. 09/54347.
French Search Report dated Feb. 9, 2010 from related French Application No. 09/54148.
French Search Report dated Feb. 8, 2010 from related French Application No. 09/54149.
French Search Report dated Feb. 2, 2010 from related French Application No. 09/54345.
French Search Report dated Feb. 17, 2010 from related French Application No. 09/54351.

* cited by examiner

*Primary Examiner* — Benjamin C Lee
*Assistant Examiner* — Adam Carlson
(74) *Attorney, Agent, or Firm* — Wolf, Greenfield & Sacks, P.C.

(57) ABSTRACT

A method for evaluating the current coupling factor between an electromagnetic transponder and a terminal, wherein a ratio between data representative of a voltage across an oscillating circuit of the transponder and obtained for two pairs of inductive and capacitive values of this oscillating circuit is compared with one or several thresholds, the two pairs of values preserving a tuning of the oscillating circuit to a same frequency.

29 Claims, 6 Drawing Sheets

INDUCTIVE EVALUATION OF THE COUPLING FACTOR OF AN ELECTROMAGNETIC TRANSPONDER

CROSS REFERENCE TO RELATED APPLICATIONS

This application claims the priority benefit of French patent application number 09/54147, filed on Jun. 19, 2009, entitled "INDUCTIVE EVALUATION OF THE COUPLING FACTOR OF AN ELECTROMAGNETIC TRANSPONDER," which is hereby incorporated by reference to the maximum extent allowable by law.

BACKGROUND OF THE INVENTION

1. Field of the Invention

The present invention generally relates to electronic systems, and more specifically to systems using electromagnetic transponders, that is, transceivers capable of being interrogated in a contactless and wireless manner by a read and/or write terminal.

2. Discussion of the Related Art

Many communication systems are based on a modulation of an electromagnetic field generated by a terminal. They range from the simplest electronic tag used as a theft-prevention device to more complex systems where a transponder intended to communicate with the terminal which has it in its field, is equipped with calculation functions (electronic purse, for example) or data processing functions.

Electromagnetic transponder systems are based on the use of oscillating circuits comprising a winding forming an antenna, on the transponder side and on the terminal side. Such circuits are intended to be coupled by near magnetic field when the transponder enters the field of the terminal. The oscillating circuits of the terminal and of the transponder are generally tuned to a same frequency corresponding to the excitation frequency of the oscillating circuit of the terminal.

In most cases, transponders have no autonomous power supply and extract the power supply necessary to their circuits from the high-frequency field radiated by the antenna of the terminal.

The quality of the communication and of the possible power transfer depends on the coupling between the terminal and the transponder. This coupling, which is inversely proportional (non linear) to the distance between the terminal and the transponder, conditions the amplitude of the voltage recovered by the transponder. It is thus needed to be able to evaluate the current coupling factor between a transponder and a terminal in the field generated by the terminal.

SUMMARY OF THE INVENTION

It would be desirable to be able to evaluate the coupling factor between a transponder and a terminal.

It would also be desirable to be able to evaluate the variation of this coupling factor during a communication.

It would also be desirable to be able to evaluate the coupling factor without it being necessary to perform a data exchange between the terminal and the transponder.

It would also be desirable to be able to perform this evaluation on the transponder side.

It would also be desirable to provide a solution independent from the type of terminal having the transponder in its field.

To achieve all or part of these objects as well as other, at least one embodiment of the present invention provides a method for evaluating the current coupling factor between an electromagnetic transponder and a terminal, wherein a ratio between data representative of a voltage across an oscillating circuit of the transponder and obtained for two pairs of inductive and capacitive values of this oscillating circuit, is compared with one or several thresholds, the two pairs of values preserving a tuning of the oscillating circuit to a same frequency.

According to an embodiment of the present invention:
first data relative to the level of a D.C. voltage provided by a rectifier across the oscillating circuit are measured and stored for a first pair of inductive and capacitive values of the oscillating circuit; and
second data relative to the level of said D.C. voltage are measured and stored for a second pair of inductive and capacitive values of the oscillating circuit.

According to an embodiment of the present invention, the evaluation provides a position of the current coupling factor with respect to an optimum coupling position with one of the two pairs of values.

According to an embodiment of the present invention, said thresholds are a function of the inductive values of the respective pairs of values.

According to an embodiment of the present invention, the coupling factor is evaluated against an optimum coupling position with the first pair of values.

An embodiment of the present invention also provides a method for protecting an electromagnetic transponder against a possible overheating based on an evaluation of the coupling, wherein a detuning of the oscillating circuit is caused if the ratio between the current coupling and the optimum coupling ranges between two thresholds.

An embodiment of the present invention also provides an electromagnetic transponder comprising:
an oscillating circuit upstream of a rectifying circuit capable of providing a D.C. voltage when the transponder is in the magnetic field of a terminal; and
at least one switchable inductive element and at least one switchable capacitive element capable of being functionally connected in parallel with the oscillating circuit.

According to an embodiment of the present invention, said switchable inductive and capacitive elements are connected to the output terminals of the rectifying circuit.

According to an embodiment of the present invention:
first switchable inductive and capacitive elements are connected between a first terminal of the oscillating circuit and the ground;
second switchable inductive and capacitive elements are connected between a second terminal of the oscillating circuit and the ground.

According to an embodiment of the present invention, the inductive elements are formed by active circuits.

According to an embodiment of the present invention, the transponder further comprises a processing unit programmed to implement the evaluation or protection method.

The foregoing objects, features, and advantages of the present invention will be discussed in detail in the following non-limiting description of specific embodiments in connection with the accompanying drawings.

DETAILED DESCRIPTION

Figure 1:
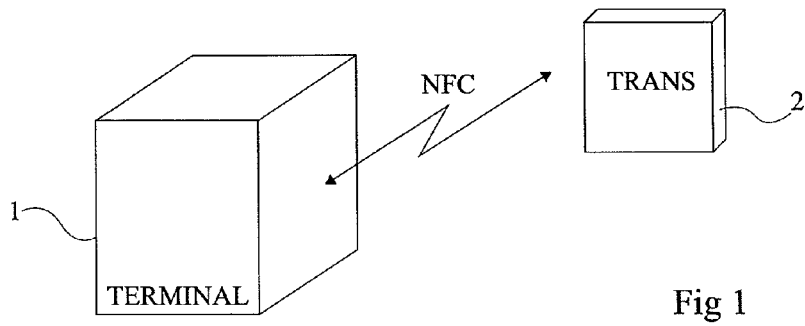
FIG. 1 is a very simplified representation of a transponder system of the type to which the present invention applies as an example.

The same elements have been designated with the same reference numerals in the different drawings. For clarity, only those steps and elements which are useful to the understanding of the present invention have been shown and will be described. In particular, the communications between the transponder and the terminal have not been detailed, the present invention being compatible with any usual communication. Further, the functions that can be implemented by a terminal or by a transponder other than the determination of the coupling factor by this transponder have not been detailed either, the present invention being here again compatible with any usual function of a terminal or of a transponder.

FIG. 1 is a block diagram of an electromagnetic transponder communication system. A terminal 1 (TERMINAL) is capable of communicating in near field (for example according to a near field communication protocol NFC) with a distant element, that is, a transponder (TRANS).

The terminal may take different forms, for example, a terminal for validating transport tickets, an electronic passport reader, a laptop computer, a mobile telecommunication device (GSM phone, PDA, etc.), an electronic control unit for starting an automobile vehicle, etc.

The transponder may similarly take different forms, for example, a chip card, an electronic transport ticket, an electronic passport, a telecommunication terminal (GSM phone, PDA, etc.), an electronic tag, etc.

Figure 2:
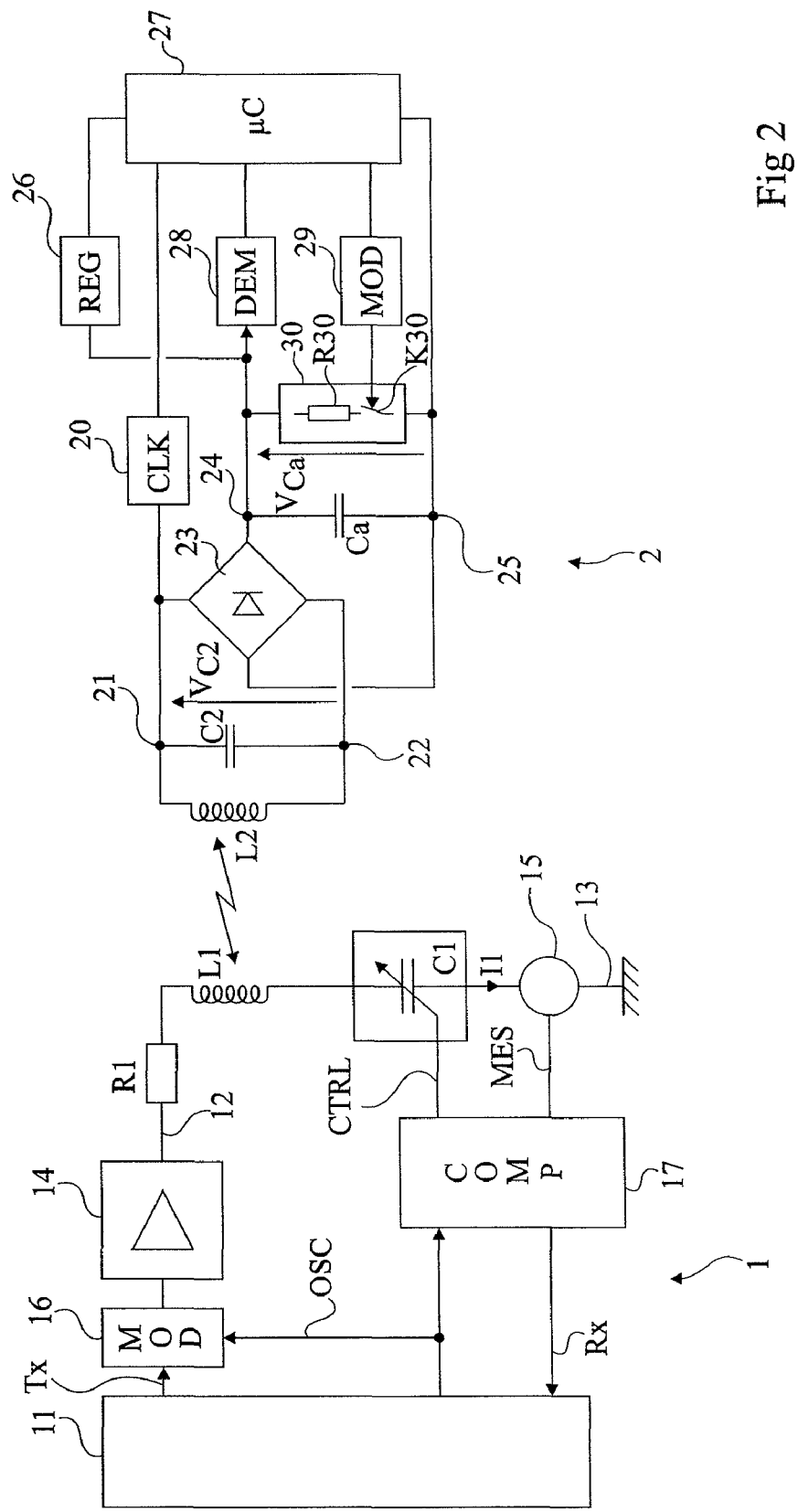
FIG. 2 is a simplified block diagram of a terminal and of a transponder of an electromagnetic transponder communication system.

FIG. 2 very schematically shows an example of a terminal 1 and of a transponder 2.

Terminal 1 comprises an oscillating circuit, generally series, formed of an inductance L1 in series with a capacitor C1 and a resistor R1. This series oscillating circuit is, in the example of FIG. 2, connected between an output terminal 12 of an amplifier or antenna coupler 14 and a terminal 13 at a reference voltage (generally the ground). An element 15 for measuring the current in the oscillating circuit is interposed, for example, between capacitive element C1 and ground 13. Measurement element 15 belongs to a phase regulation loop which will be described hereafter. Amplifier 14 receives a high-frequency transmission signal originating from a modulator 16 (MOD) which receives a reference frequency (signal OSC), for example, from a quartz oscillator (not shown). Modulator 16 receives, if need be, a signal Tx originating from a circuit 11 for controlling and exploiting the transmissions. Circuit 11 is generally provided with a control and data processing microprocessor, communicating with different input/output circuits (keyboard, display, element of exchange with a server, etc.) and/or processing circuits, not shown. The elements of terminal 1 most often draw the power necessary to their operation from a supply circuit (not shown) connected, for example, to the power line distribution system (mains) or to a battery (for example, that of an automobile vehicle or of a portable telephone or computer). Modulator 16 provides a high-frequency carrier (for example, at 13.56 MHz) to series oscillating circuit L1-C1 which generates a magnetic field.

Capacitive element C1 is, for example, a variable-capacitance element controllable by a signal CTRL. This element takes part in the phase regulation of current I1 in antenna L1 with respect to a reference signal. This regulation is a regulation of the high-frequency signal, that is, of the signal of the carrier corresponding to the signal provided to amplifier 14 in the absence of data Tx to be transmitted. The regulation is performed by varying capacitance C1 of the oscillating circuit of the terminal to maintain the current in the antenna in constant phase relationship with a reference signal. This reference signal for example corresponds to signal OSC provided to modulator 14. Signal CTRL originates from a circuit 17 (COMP) having the function of detecting the phase interval with respect to the reference signal and of accordingly modifying the capacitance of element C1. The comparator receives data MES about current I1 in the oscillating circuit detected by measurement element 15 (for example, a current transformer or a resistor).

A transponder 2, capable of cooperating with terminal 1, comprises an oscillating circuit, for example, parallel, formed of an inductance L2 in parallel with a capacitor C2 between two terminals 21 and 22. The parallel oscillating circuit (called reception resonant circuit) is intended to capture the magnetic field generated by oscillating circuit L1-C1 of terminal 1. Circuits L2-C2 and L1-C1 are tuned to a same resonance frequency (for example, 13.56 MHz). Terminals 21 and 22 are connected to two A.C. input terminals of a rectifying bridge 23 (most often, fullwave). The rectified output terminals of bridge 23 respectively define a positive terminal 24 and a reference terminal 25. A capacitor Ca is connected between terminals 24 and 25 to smooth the rectified voltage. The recovered power is used to recharge a battery, not shown.

When transponder 2 is in the field of terminal 1, a high-frequency voltage is generated across resonant circuit L2-C2. This voltage, rectified by bridge 23 and smoothed by capacitor Ca, provides a supply voltage to electronic circuits of the transponder via a voltage regulator 26 (REG). Such circuits generally comprise a processing unit 27 (for example, a microcontroller µC) associated with a memory (not shown), a demodulator 28 (DEM) of the signals that may have been received from terminal 1, and a modulator 29 (MOD) for transmitting data to the terminal. The transponder is generally synchronized by means of a clock (CLK) extracted, by a block 20, from the high-frequency signal recovered, before rectification, from one of terminals 21 and 22. Most often, all the electronic circuits of transponder 2 are integrated in the same chip.

To transmit data from terminal 1 to the transponder, circuit 16 modulates (generally in amplitude) the carrier (signal OSC) according to signal Tx. On the side of transponder 2, these data are demodulated by demodulator 28 based on voltage $V_{C_a}$. The demodulator may sample the signal to be demodulated upstream of the rectifying bridge.

To transmit data from transponder 2 to terminal 1, modulator 29 controls a stage 30 of modulation (retromodulation) of the load formed by the transponder circuits on the magnetic field generated by the terminal. This stage is generally formed of an electronic switch K30 (for example, a transistor) and of a resistor R30 (or a capacitor), in series between terminals 24 and 25. Switch K30 is controlled at a so-called sub-carrier frequency (for example, 847.5 kHz), much lower (generally with a ratio of at least 10) than the frequency of the excitation signal of the oscillating circuit of terminal 1. When switch K30 is on, the oscillating circuit of the transponder is submitted to an additional damping with respect to the load formed by circuits 20, 26, 27, 28, and 29 so that the transponder samples a greater amount of power from the high-frequency magnetic field. On the side of terminal 1, amplifier 14 maintains the amplitude of the high-frequency excitation signal constant. Accordingly, the power variation of the transponder translates as an amplitude and phase variation of the current in antenna L1. This variation is detected by an amplitude or phase demodulator of the terminal. In the embodiment illustrated in FIG. 2, comparator 17 integrates a phase demodulator also used to demodulate the signal originating from the transponder. Accordingly, comparator 17 provides a signal Rx giving back to circuit 11 a possible retromodulation of data received from a transponder. Other demodulation circuits may be provided, for example, a circuit exploiting a measurement of the voltage across capacitor C1.

Many variations exist to encode/decode and modulate/demodulate communications between a transponder and a terminal.

The response time of the phase regulation loop is sufficiently long to avoid disturbing the possible retromodulation from a transponder and sufficiently short as compared with the speed at which a transponder passes in the field of the terminal. One can speak of a static regulation with respect to the modulation frequencies (for example, the 13.56-MHz frequency of the remote supply carrier and the 847.5-kHz retromodulation frequency used to transmit data from the transponder to the terminal).

An example of a phase regulation terminal is described in document EP-A-0857981.

Regulation of the phase on the terminal side allows using current and voltage measurements in the oscillating circuit of the transponder to deduce, from these measurements, information relative to the transponder coupling when it is in the field of the terminal. The coupling coefficient between the oscillating circuit of the terminal and of the transponder essentially depends on the distance separating the transponder from the terminal. The coupling coefficient, noted k, is always between 0 and 1. It can be defined by the following formula:

$$k = \frac{M}{\sqrt{L1 \cdot L2}}, \quad \text{(formula 1)}$$

where M represents the mutual inductance between inductances L1 and L2 of the oscillating circuits of the terminal and of the transponder.

An optimum coupling is defined as being the position at which voltage $V_{C2}$ across the oscillating circuit of the transponder is maximum. This optimum coupling, noted $k_{opt}$, may be expressed as:

$$k_{opt} = \sqrt{\frac{L2}{L1} \cdot \frac{R1}{R2}}, \quad \text{(formula 2)}$$

where R2 represents the resistance equivalent to the load formed by the elements of the transponder on its own oscillating circuit. In other words, resistance R2 represents the equivalent resistance of all the circuits of transponder 2, placed in parallel on capacitor C2 and inductance L2 (before or after the rectifying bridge). It is called the load or consumption due to the transponder circuits. The level of this load is symbolized by resistor R2 in parallel across the oscillating circuit. In above formula 2, the series resistance of inductance L1 (terminal antenna) has been neglected. It can also be considered that the value of this series resistance is, for simplification, included in the value of resistor R1.

Figure 3:
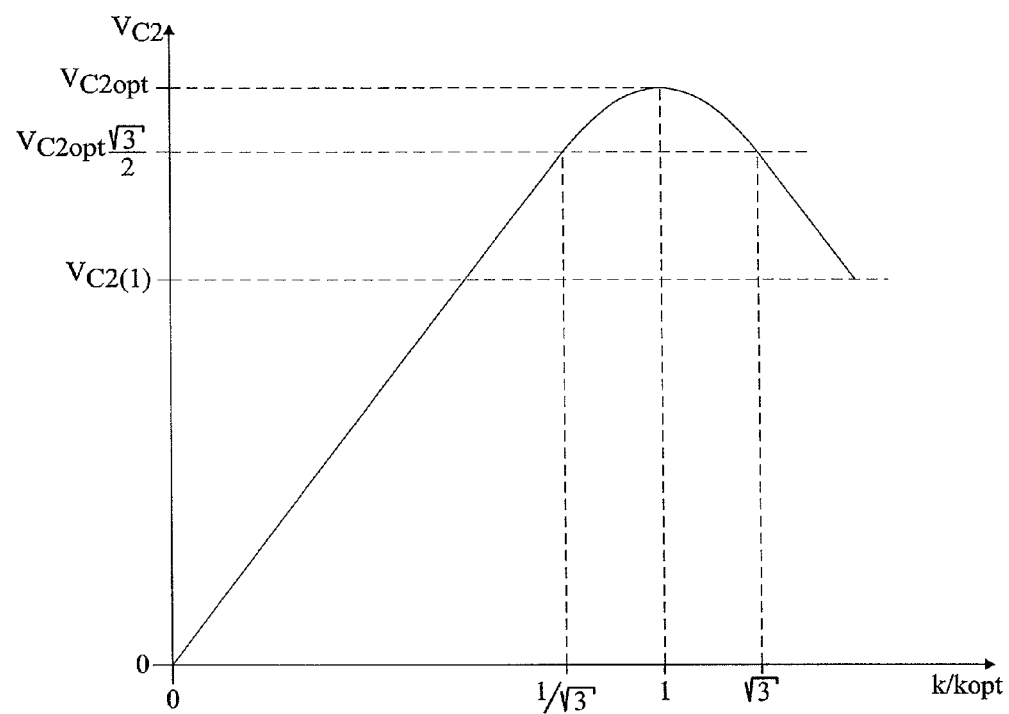
FIG. 3 illustrates an example of the variation of the voltage across the oscillating circuit of the transponder according to the coupling factor.

FIG. 3 shows an example of the shape of voltage $V_{C2}$ recovered on the transponder side according to the coupling $k/k_{opt}$ normalized with respect to the optimum coupling. The curve starts from the origin of ordinates (zero voltage) for a zero coupling. This corresponds to a distance from the transponder to the terminal such that no signal is sensed by the transponder. Voltage $V_{C2}$ reaches a maximum value $V_{C2opt}$ for optimum coupling coefficient $k_{opt}$ ($k/k_{opt}$=1), then decreases to an intermediary value $V_{C2}(1)$ reached at coupling k=1.

As illustrated in FIG. 3, voltage $V_{C2}$ transits through two points of inflexion for coupling values corresponding to ratios $k/k_{opt}$=1/$\sqrt{3}$ and $k/k_{opt}$=$\sqrt{3}$, for which voltage $V_{C2}$ takes value $$V_{C2opt} \cdot \frac{\sqrt{3}}{2}.$$

To evaluate, on the transponder side, the coupling of this transponder with the terminal, the information of voltage $V_{C2}$ across capacitive element C2 of its oscillating circuit is used. This voltage is provided by the following relation:

$$V_{C2} = \frac{I2}{\omega \cdot C_2}, \quad \text{(formula 3)}$$

where I2 represents the current in the oscillating circuit of the transponder, and where ω represents the pulse of the signal.

Current I2 is equal to:

$$I2 = \frac{M \cdot \omega \cdot I1}{Z2}, \quad \text{(formula 4)}$$

where I1 represents the current in the oscillating circuit of the terminal and where Z2 represents the transponder impedance.

Impedance Z2 of the transponder is provided by the following relation:

$$Z2^2 = X2^2 + \left(\frac{L2}{R2 \cdot C2}\right)^2, \quad \text{(formula 5)}$$

where X2 represents the imaginary part of the impedance of the oscillating circuit $$\left(X2 = \omega \cdot L2 - \frac{1}{\omega \cdot C2}\right).$$

Further, current I1 in the oscillating circuit of the terminal is given by the following relation:

$$I1 = \frac{Vg}{Z1_{app}}, \quad \text{(formula 6)}$$

where Vg designates a so-called generator voltage, exciting the oscillating circuit of the terminal, and where $Z1_{app}$ represents the apparent impedance of the oscillating circuit.

Regulation of the phase of the oscillating circuit of the terminal allows all the variations which would tend to modify, statically with respect to the modulation frequencies, the imaginary part of the load formed by the transponder, to be compensated by the phase regulation loop. It is thus ensured that in static operation, the imaginary part of impedance $Z1_{app}$ is zero. Accordingly, impedance $Z1_{app}$ becomes equal to apparent resistance $R1_{app}$ (real part of the impedance) and may be expressed as:

$$Z1_{app} = R1_{app} = R1 + \frac{k^2 \cdot \omega^2 \cdot L1 \cdot L2^2}{Z2^2 \cdot R2 \cdot C2}. \quad \text{(formula 7)}$$

Since the oscillating circuits are tuned, it can be considered that imaginary part X2 of impedance Z2 is, as a first approximation, close to zero. As a result, the value of impedance Z2 can be written as:

$$Z2 = \frac{L2}{R2 \cdot C2}. \quad \text{(formula 8)}$$

By inserting this simplification into formulas 4 and 7, and inserting formula 4 into formula 3, the following formula can be obtained for voltage $V_{C2}$ recovered across the oscillating circuit of the transponder:

$$V_{C2} = k \cdot \sqrt{\frac{L1}{L2}} \cdot \frac{Vg}{\frac{R1}{R2} + k^2 \cdot \frac{L1}{L2}}. \quad \text{(formula 9)}$$

In optimum coupling position $k_{opt}$, maximum voltage $V_{C2opt}$ is thus provided by the following formula (combining formulas 2 and 9):

$$V_{C2opt} = \frac{Vg}{2} \cdot \sqrt{\frac{R2}{R1}}. \quad \text{(formula 10)}$$

It should be noted that formula 9 is only applicable when the oscillating circuit of transponder L2-C2 is considered to be set to the tuning frequency, that is, $\omega \cdot \sqrt{L2 \cdot C2} = 1$.

By combining formulas 9 and 10 and by expressing the coupling as normalized by the optimum coupling ($k/k_{opt}$), the following expression of voltage $V_{C2}$ is obtained:

$$V_{C2} = 2 \cdot V_{C2opt} \cdot \frac{\frac{k}{k_{opt}}}{1 + \left(\frac{k}{k_{opt}}\right)^2}. \quad \text{(formula 11)}$$

For a given coupling value k, considering that the impedance of the oscillating circuit of the terminal does not vary and that the circuits remain tuned, the ratio between current coefficients k and optimum coefficients $k_{opt]L20}$ and $k_{opt]L21}$, respectively for an inductance L2 of value L20 and of value L21 provides, according to formula 2, the following expression:

$$\frac{\frac{k}{k_{opt]L20}}}{\frac{k}{k_{opt]L21}}} = \sqrt{\frac{L21}{L20}}. \quad \text{(formula 12)}$$

Still for a given coupling value k and considering that the impedance of the oscillating circuit of the terminal does not vary and that the circuits remain tuned, the ratio between values $V_{C2]L21}$ and $V_{C2]L20}$ of voltage $V_{C2}$, respectively for values L21 and L20 of inductance L2, provides the following relation:

$$\frac{V_{C2]L21}}{V_{C2]L20}} = \frac{\left(\frac{k}{k_{opt]L20}}\right)^2 + 1}{\left(\frac{k}{k_{opt]L20}}\right)^2 + \frac{L21}{L20}} \cdot \sqrt{\frac{L21}{L20}}. \quad \text{(formula 13)}$$

It is provided to evaluate the position of coupling k with respect to its optimum value $k_{opt]L20}$ with a first inductance value L20.

Indeed, for a coupling position $k_{opt]L20}$ corresponding to the optimum coupling with inductance L20, formula 13 enables to write, with voltage $V_{C2]L20}$ then equal to $V_{C2opt]L20}$:

$$\frac{V_{C2]L21}}{V_{C2opt]L20}} = \frac{2}{\sqrt{\frac{L20}{L21}} + \sqrt{\frac{L21}{L20}}}. \quad \text{(formula 14)}$$

It is provided to use this relation to determine, from a ratio "r" between voltages $V_{C2]L21}$ and $V_{C2]L20}$ with known inductance values L21 and L20 (maintaining the tuning of the oscillating circuit by a corresponding variation of capacitive element C2), the position of the transponder with respect to optimum coupling $k_{opt]L20}$.

$$\text{If } \frac{V_{C2]L21}}{V_{C2]L20}} > \frac{2}{\sqrt{\frac{L20}{L21}} + \sqrt{\frac{L21}{L20}}} \quad \text{(formula 15)}$$

then the current coupling is lower than the optimum coupling.

Conversely, if $$\frac{V_{C2]L21}}{V_{C2]L20}} < \frac{2}{\sqrt{\frac{L20}{L21}} + \sqrt{\frac{L21}{L20}}}, \quad \text{(formula 16)}$$

the current coupling is greater than the optimum coupling. If the two values are equal, this means that the optimum coupling point has been reached.

In practice, rather than a direct measurement of the voltage across the oscillating circuit, a measurement the smoothed voltage across capacitor $V_{Ca}$ at the output of rectifying bridge 23 is performed. Voltage $V_{Ca}$ is proportional to voltage $V_{C2}$. Since voltage ratios are being evaluated, it is not necessary to know the proportionality factor between voltages $V_{C2}$ and $V_{Ca}$. In a specific embodiment, the measurement is performed by the microprocessor. The storage of the values of the measured voltages is performed either by analog means or, preferentially, digitally over several bits, the number of which depends on the desired accuracy of analysis.

The estimate of the position of current coupling k with respect to its optimal value may be refined by estimating the position with respect to the points of inflexion of the curve of FIG. 3. Indeed, for coupling positions where ratio $k/k_{opt}=1/\sqrt{3}$ and $k/k_{opt}=\sqrt{3}$, formula 13 enables to write:

$$r = \frac{4}{\sqrt{\frac{L20}{L21}} + 3 \cdot \sqrt{\frac{L21}{L20}}}, \text{ and} \quad \text{(formula 17)}$$

$$r = \frac{4}{3 \cdot \sqrt{\frac{L20}{L21}} + \sqrt{\frac{L21}{L20}}}. \quad \text{(formula 18)}$$

Figure 4:
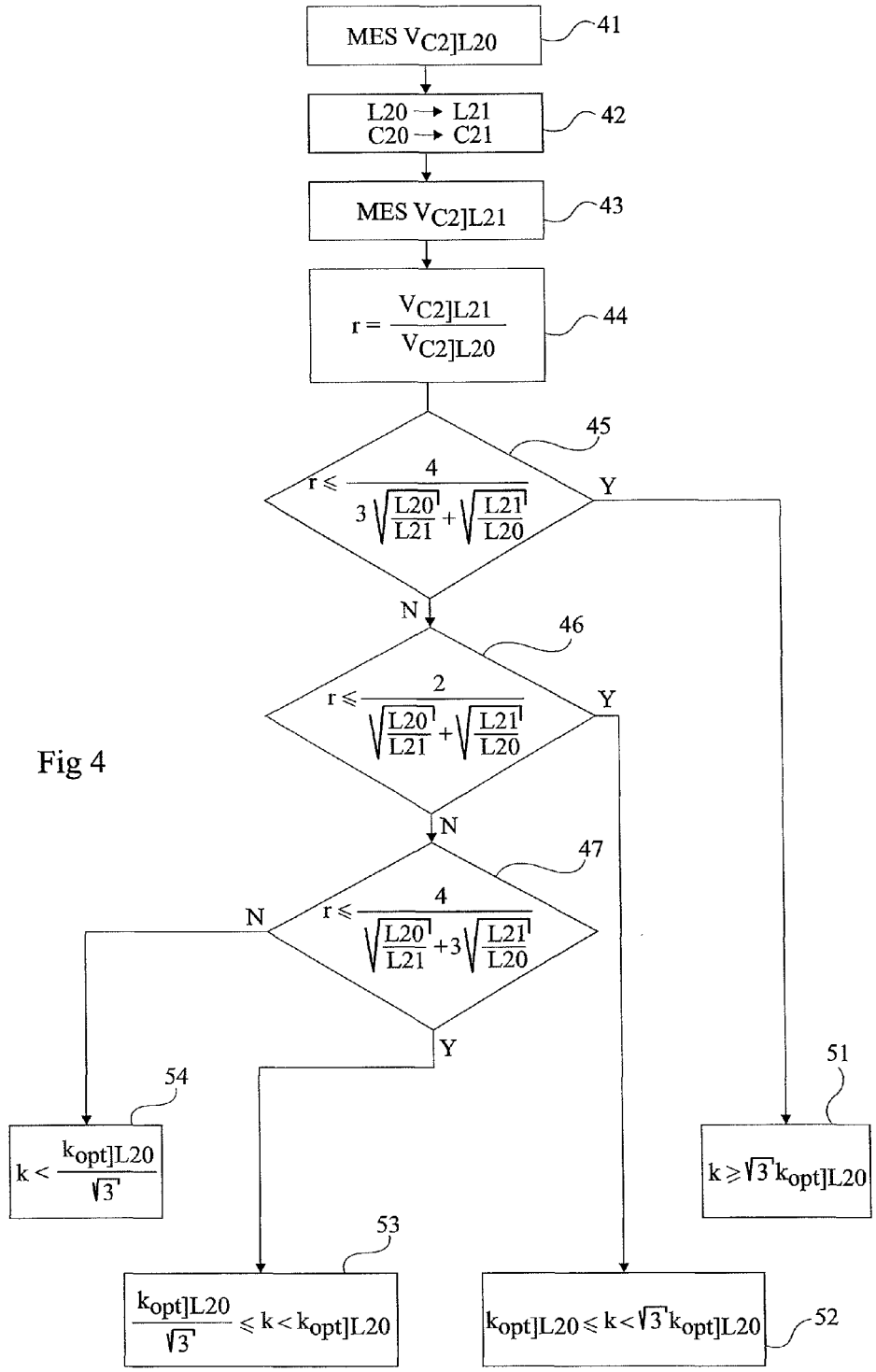
FIG. 4 is a functional block diagram illustrating an embodiment of the method for evaluating the coupling factor.

FIG. 4 illustrates the implementation of such an embodiment. To simplify the discussion of FIG. 4, reference is still made to values $V_{C2]L20}$ and $V_{C2]L21}$, knowing that it is in practice easier to measure values $V_{Ca]L20}$ and $V_{Ca]L21}$ of voltage $V_{Ca}$ but that this changes nothing to the comparison thresholds of ratio r.

It is started (block 41, MES $V_{C2]L20}$) by measuring and storing the voltage across capacitor C2 with a first inductance value (L20). Then, (block 42, L20→L21, C20→C21), the value of the inductive element is modified towards a lower value. As a variation, this modification is performed towards a higher value but it is in practice easier to decrease the value of an inductance by connecting another inductance in parallel than to increase it.

To preserve the tuning of the oscillating circuits, the value of capacitor C2 is modified correspondingly, for example, for a division of the inductance value by 2 by connection of an inductance having the same value as inductance L20 in parallel on the latter, the value of capacitance C2 needs to be multiplied by two, so that the ratio of the capacitive elements is equal to 0.5.

Then (block 43, $V_{C2]L21}$), voltage $V_{C2}$ is measured with the inductance value L21, which is stored.

Ratio r between the measured voltages is then calculated and stored (block 44, $$r = \frac{V_{C2]L21}}{V_{C2]L20}})$$

to be compared with the different thresholds enabling to determine the position of the coupling with respect to the optimum coupling and to the characteristic points where $k/k_{opt}=1/\sqrt{3}$ and $k/k_{opt}=\sqrt{3}$. As a variation, ratio r is calculated for each subsequent comparison.

For example, it is started by comparing (block 45, $$r \leq \frac{4}{3 \cdot \sqrt{\frac{L20}{L21}} + \sqrt{\frac{L21}{L20}}})$$

ratio r with a threshold corresponding to point $k/k_{opt]L20}=\sqrt{3}$. If r remains smaller than or equal to this threshold (output Y of block 45), processing circuit 27 provides the information (block 51, $k \geq \sqrt{3} \cdot k_{opt]L20}$) that the current coupling is greater than or equal to optimum coupling $k_{opt]L20}$, multiplied by $\sqrt{3}$.

If r is greater than the first threshold (output N of block 45), it is tested (block 46, $$r \leq \frac{2}{\sqrt{\frac{L20}{L21}} + \sqrt{\frac{L21}{L20}}})$$

whether it is smaller than or equal to a second threshold corresponding to optimum coupling $k_{opt]L20}$. If so (output Y of block 46), the current coupling ranges between the optimum coupling and its product by $\sqrt{3}$ (block 52, $k_{opt]L20} \leq k < \sqrt{3} \cdot k_{opt]L20}$).

If not (output N of block 46), it is tested (block 47, $$r \leq \frac{4}{\sqrt{\frac{L20}{L21}} + 3 \cdot \sqrt{\frac{L21}{L20}}})$$

whether r is smaller than or equal to a third threshold corresponding to point $k/k_{opt]L20}=1/\sqrt{3}$. If so (output Y of block 47), the current coupling ranges between the optimum coupling and the quotient of the optimum coupling over $\sqrt{3}$ (block 53, $$\frac{k_{opt]L20}}{\sqrt{3}} \leq k < k_{opt]L20}).$$

If not (output N of block 47), the current coupling is lower than the optimum coupling divided by $\sqrt{3}$ (block 54, $$k < \frac{k_{opt]L20}}{\sqrt{3}}).$$

Steps 45 to 47 may be carried out in a different order. Further, strict inequalities (< or >) and non-strict inequalities ($\leq$ and $\geq$) and may be inverted.

Once these measurements have been performed with pair (L21, C21), it is returned to pair (L20, C20), which is considered as nominal. This return to the nominal values preferably occurs as soon as the measurement has been performed (before step 44). It may however be provided for it to occur later in the process, for example, at the end of the evaluation.

It is thus possible, by two voltage measurements with inductance values of the oscillating circuit of the transponder, to have said transponder determine the current coupling with the terminal against an optimum coupling.

Figure 5:
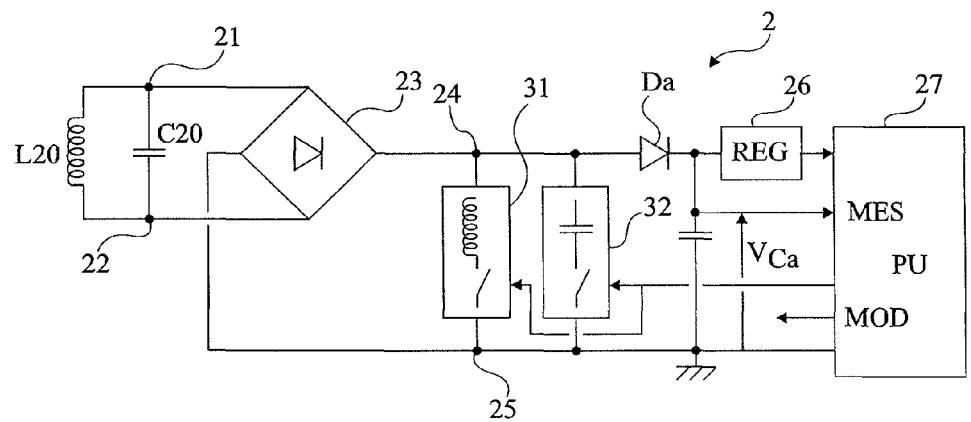
FIG. 5 is a block diagram of an embodiment of a transponder capable of evaluating the coupling factor of its coupling with a terminal.

FIG. 5 is a block diagram of an embodiment of a transponder 2, equipped to automatically determine, when it is in the field of a terminal (not shown), the current coupling with respect to the optimum coupling. The representation of FIG. 5 is simplified with respect to that of FIG. 2. In particular, the elements of demodulation, retromodulation, and for obtaining the clock frequency have not been illustrated.

As previously, transponder 2 is based on a parallel oscillating circuit. In the example of FIG. 5, it is assumed that an inductive element L20 and a capacitive element C20 are present upstream of diode bridge 23 with respect to processing circuit 27 are present. A switchable inductive element 31 and a switchable capacitive element 32 in parallel are provided between rectified output terminals 24 and 25 of rectifying bridge 23. Elements 31 and 32 are intended to be switched to implement the method of determination of the coupling position, but these are not retromodulation means. To avoid an influence of capacitor Ca, said capacitor is placed downstream of blocks 31 and 32, and a diode Da is interposed on the positive line between these blocks and the connection of capacitor Ca. As a variation, the diode may be placed on the reference line, provided to accept a voltage drop between the reference of blocks 31 and 32 and those of the other circuits on the side of unit 27. Processing unit 27 (PU) receives information about voltage $V_{Ca}$ on an input MES to implement the above-described method. The values given to elements 31 and 32 are such that, when they are functionally input into the oscillating circuit, the transponder behaves as if its oscillating circuit exhibited an inductance of value L21 in parallel with a capacitor of value C21.

Figure 6:
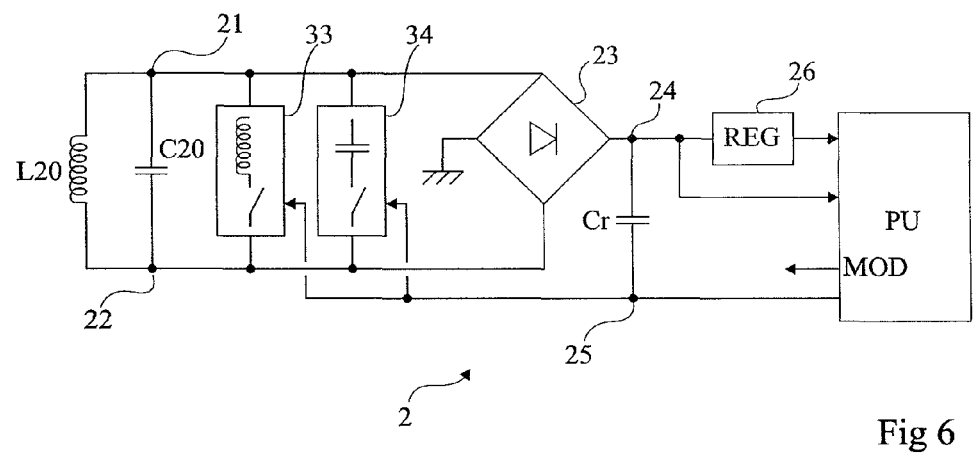
FIG. 6 is a block diagram of another embodiment of a transponder capable of evaluating its coupling factor.

FIG. 6 is a block diagram of another embodiment of a transponder. As compared with the embodiment of FIG. 5, switchable inductive and capacitive elements 33 and 34 are connected upstream of bridge 23, that is, directly in parallel on elements L20 and C20. A switchable antenna may, for example, be used.

Figure 7:
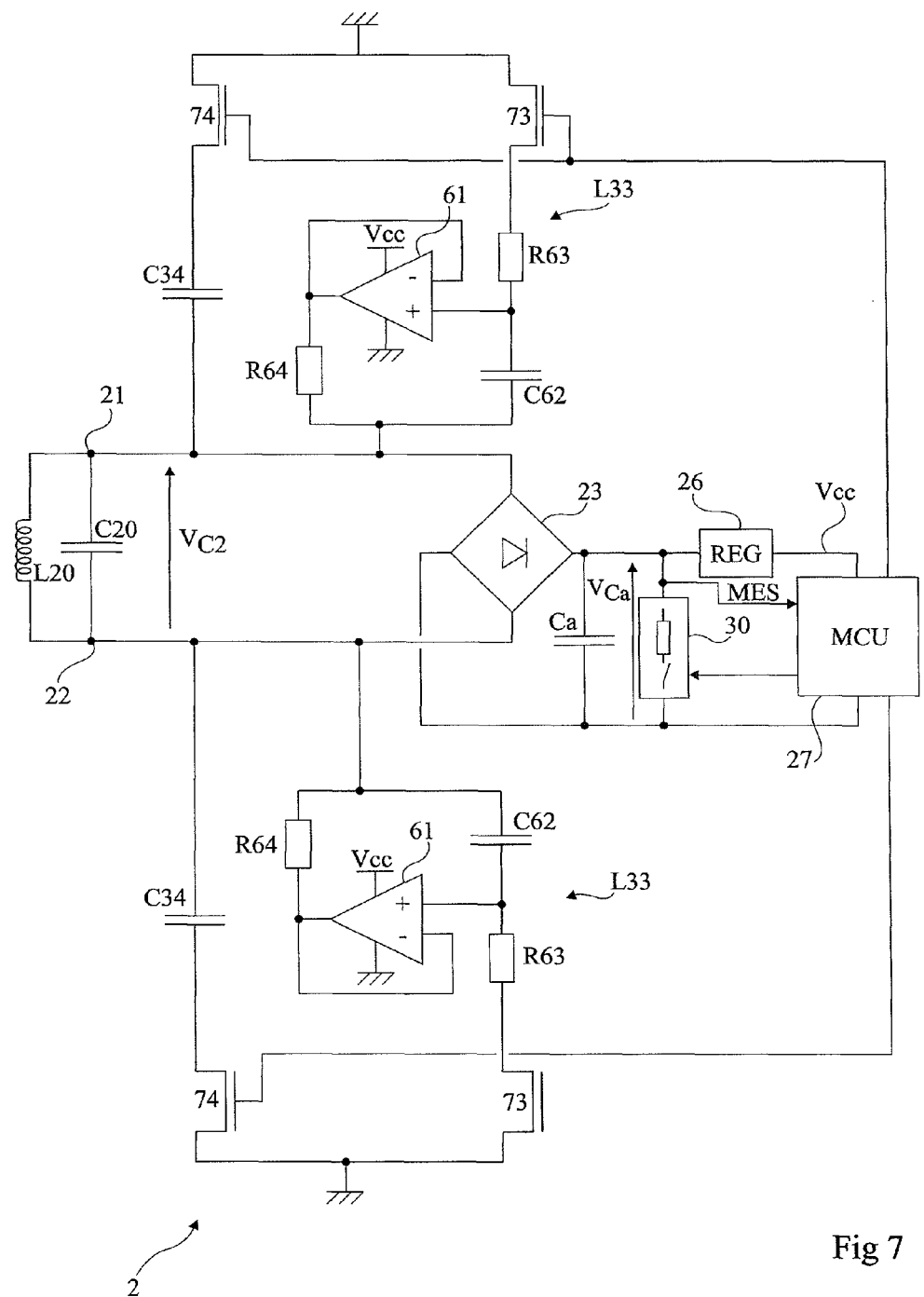
FIG. 7 is a more detailed block diagram of an embodiment of a transponder of the type shown in FIG. 5.

FIG. 7 shows an example of a more detailed diagram of a transponder 2 equipped to evaluate the coupling factor when it is in the field of a terminal. This embodiment corresponds to FIG. 6, that is, with the switchable inductive and capacitive elements upstream of rectifying bridge 23. To ease the control from processing unit (MCU) 27, a capacitive element C34 and an inductive element L33 are provided between each terminal 21 and 22 of the oscillating circuit and the ground. Each capacitive element C34 is in series with a switch 74 and each inductive element L33 is in series with a switch 73. Switches 73 and 74 (for example, MOS transistors) are controlled by central processing unit 27. In FIG. 7, a retromodulation stage 30 (for example, resistive) has been illustrated.

Preferably, each inductive element L33 is formed by an active circuit (gyrator), more easily integrable than an inductive winding. Such a circuit comprises an operational amplifier 61 having its non-inverting input connected to the junction point of a capacitive element C62 and of a resistive element R63 between terminal 21 (respectively, 22) and switch 73. The inverting input of amplifier 61 is looped back on its output and is connected to terminal 21, respectively 22, by a resistor R64. The operation of a gyrator is known. It amounts to connecting, between terminal 21 and the ground, an inductive element L33 approximately having as a value the product of resistors R63 and R64 and of capacitor C62 (L33=R63·R64·C62), and as a series resistor, a resistor of value R64.

Figure 8:
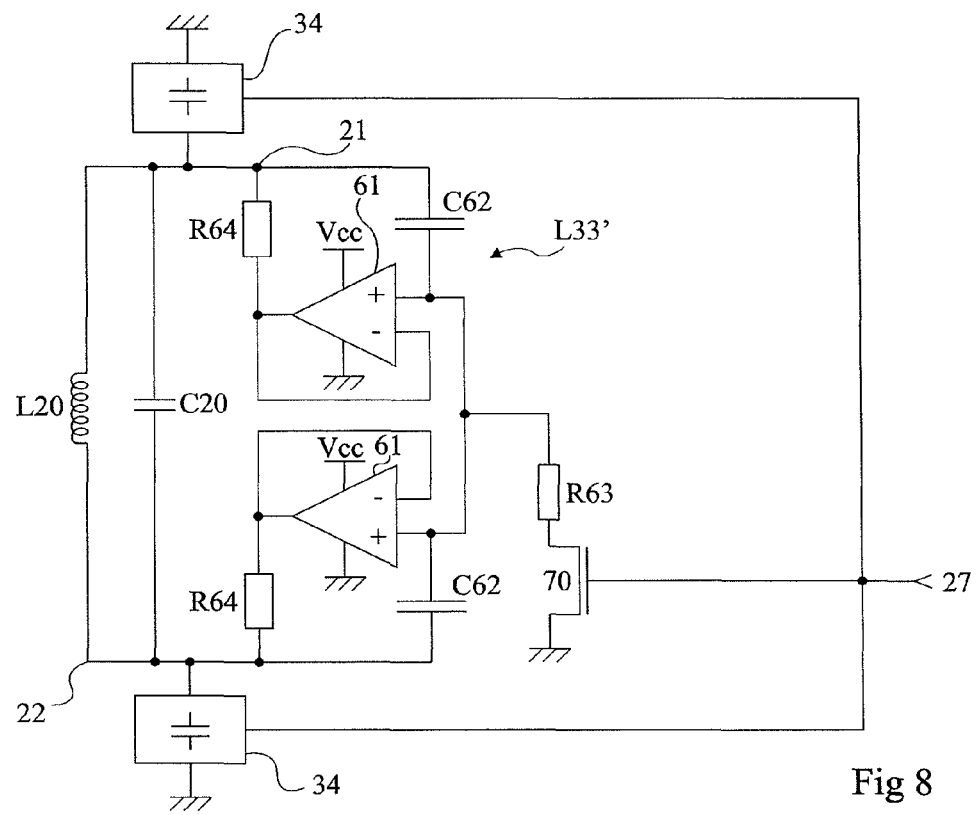
FIG. 8 is a partial view of a more detailed embodiment of a transponder of the type of that in FIG. 5.

FIG. 8 partially and schematically shows another embodiment in which a gyrator L33' is connected in parallel on the oscillating circuit. To respect the need for a ground connection of a gyrator and enable its control, gyrator 23' comprises two amplifiers 61 respectively connected to terminals 21 and 22 and their respective non-inverting inputs share the same resistor R63 and the same switch 70. For simplification, switchable capacitive elements 34 have not been detailed in FIG. 8.

Figure 9:
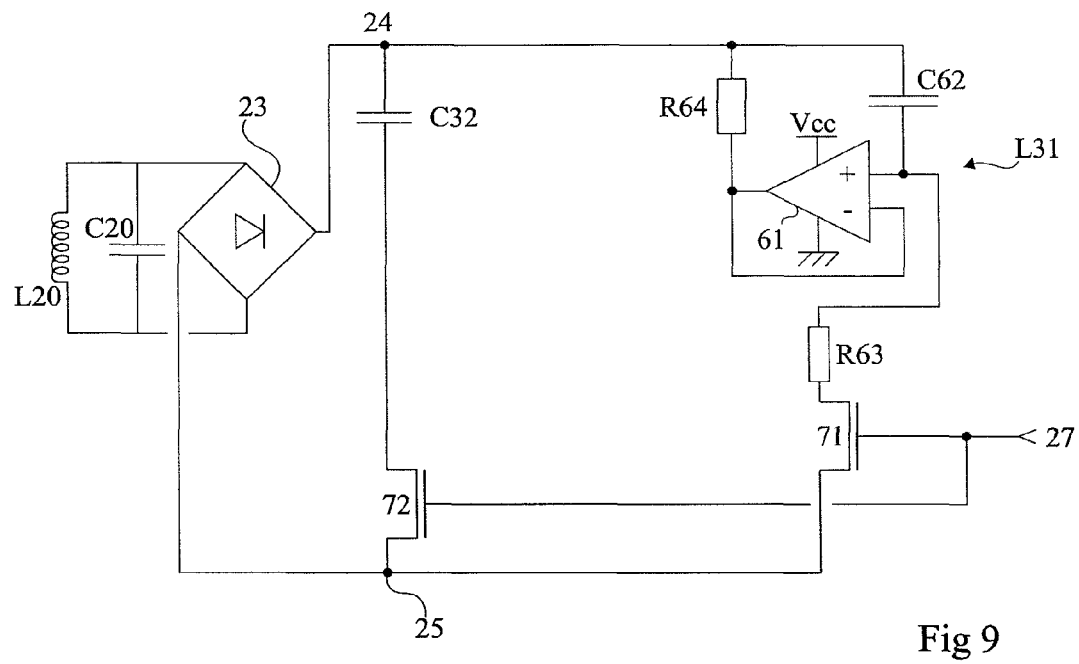
FIG. 9 is a simplified partial electric diagram of a transponder of the type shown in FIG. 5.

FIG. 9 is a simplified partial view of another embodiment corresponding to the connection of FIG. 5, that is, with the switchable inductive and capacitive elements downstream of rectifying bridge 23. In this case, a single switchable capacitive element C32 and a single switchable inductive element L31 are sufficient. In the example of FIG. 9, capacitive element C32 is in series with a switch 72 between terminals 24 and 25. The switchable inductive element is formed by a gyrator L31 between terminal 24 and terminal 25. This gyrator is switchable by means of a switch 71. Switches 71 and 72 receive the same control signal originating from processing unit 27 to cause the switching of the oscillating circuit from value L20 to value L21 (and from value C20 to value C21).

It should be noted that decreasing the value of inductance L2 by placing active inductances in parallel amounts to placing the equivalent resistor of the active inductance in parallel with the resistor (R2) equivalent to the transponder load. Accordingly, decreasing value L2 by means of such gyrators amounts to decreasing the equivalent resistance of the transponder and thus to increasing its power consumption. A decrease in the inductance value compatible with preserving a remote supply of the transponder will preferably be provided.

The thresholds used to determine the position with respect to the optimum coupling only depend on values L20 and L21, which are known for a given transponder. Accordingly, the transponder does not necessarily need advanced microprocessor-type calculation means but can simply measure the voltages, calculate the ratio, and compare it with analog thresholds generated, for example, by resistive dividing bridges. According to another example, the thresholds are precalculated and stored in a non-volatile memory of the transponder.

Knowing the current coupling coefficient with respect to the optimum coupling may have several applications.

For example, this information may be used to detect a risk of overheating of the transponder. Indeed, when the coupling is close to the optimum coupling, the power recovered by the transponder is maximum. A possible overheating can thus be avoided by causing a detuning of the oscillating circuit, for example by providing a switchable capacitive element to detune oscillating circuit L2-C2. It is provided to detune the oscillating circuit if ratio $k/k_{opt}$ ranges between two thresholds around the optimum coupling position. A detuning may, for example, be selected when coupling coefficient k ranges between $k_{opt}/\sqrt{3}$ and $k_{opt}·\sqrt{3}$. The capacitive element used to evaluate the coupling may be reused. For example, it is possible to only switch switches 72 (FIG. 9) and 74 (FIG. 7) or blocks 32 (FIG. 5) or 34 (FIG. 6) by providing separate control links.

According to another example of application, knowing the position of the coupling with respect to the optimum coupling enables improving the power management in the communication with a terminal. The functions executed by the transponder processing unit can thus be selected according to the available power.

The evaluation of the coupling may be performed periodically during a switching. The only precaution to be taken is not to evaluate the coupling during a retromodulation of the transponder. A first evaluation is for example performed as soon as the power recovered by the transponder is sufficient for transponder 27 to operate. Then, periodic measurements are performed during the switching.

According to still another example, the position of the current coupling with respect to the optimum coupling is transmitted to the terminal so that it adapts the communication (the requests that it sends to the transponder) to the power available for the transponder and which conditions its calculating capacity.

It should be noted that the determination of the coupling is performed without requiring for a communication with the terminal to be established.

Further, the value of the optimum coupling varies from one terminal to another. Evaluating the current coupling with respect to the optimum coupling such as described hereabove enables to no longer depend on the characteristics of a given terminal and makes the evaluation independent from the terminal. Thus, a transponder equipped with the coupling evaluation means of the present invention can operate with any existing terminal.

Various embodiments with different variations have been described hereabove. It should be noted that those skilled in the art can combine various elements of these various embodiments and variations without showing any inventive step.

Further, the selection of the values to be given to the inductive and capacitive elements depends on the application.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for evaluating a current coupling factor between an electromagnetic transponder and a terminal, comprising:
   obtaining data representative of a voltage across an oscillating circuit of the transponder for two pairs of inductive and capacitive values of the oscillating circuit, the two pairs of values preserving a tuning of the oscillating circuit to a same frequency;
   comparing a ratio with one or several thresholds, wherein the ratio is between the data representative of the voltage across the oscillating circuit for the two pairs of inductive and capacitive values;
   generating an evaluation of the current coupling factor between the transponder and the terminal based on a result of the comparing; and
   operating the transponder in accordance with the evaluation.

2. The method of claim 1, wherein obtaining data representative of the voltage across the oscillating circuit comprises:
   measuring and storing first data relative to the level of a D.C. voltage provided by a rectifier connected across the oscillating circuit for a first pair of inductive and capacitive values of the oscillating circuit; and
   measuring and storing second data relative to the level of said D.C. voltage for a second pair of inductive and capacitive values of the oscillating circuit.

3. The method of claim 1, further comprising determining, based on the evaluation, a position of the current coupling factor with respect to an optimum coupling position with a first of the two pairs of values.

4. The method of claim 1, wherein a threshold of said one or several thresholds is a function of the inductive values of the respective pairs of values.

5. The method of claim 1, wherein the current coupling factor is evaluated against an optimum coupling position with a first of the two pairs of values.

6. A method for protecting an electromagnetic transponder against a possible overheating using the method of claim 1 by controlling operation of the transponder based on the evaluation, and further comprising detuning the oscillating circuit if the ratio between the current coupling factor and an optimum coupling ranges between two thresholds.

7. An electromagnetic transponder comprising:
   an oscillating circuit, upstream of a rectifying circuit capable of providing a D.C. voltage when the transponder is in a magnetic field of a terminal; and
   at least one switchable inductive element and at least one switchable capacitive element capable of being functionally connected in parallel with the oscillating circuit;
   a processing unit programmed to:
   obtain data representative of a voltage across the oscillating circuit for two pairs of inductive and capacitive values of the oscillating circuit, the two pairs of values preserving a tuning of the oscillating circuit to a same frequency; and
   compare a ratio with one or several thresholds, wherein the ratio is between the data representative of the voltage across the oscillating circuit for the two pairs of inductive and capacitive values;
   generate an evaluation of a current coupling factor between the transponder and the terminal based on a result of the comparing; and
   operate the transponder in accordance with the evaluation.

8. The transponder of claim 7, wherein said switchable inductive and capacitive elements are connected to output terminals of the rectifying circuit.

9. The transponder of claim 7, wherein:
   first switchable inductive and capacitive elements are connected between a first terminal of the oscillating circuit and the ground;
   second switchable inductive and capacitive elements are connected between a second terminal of the oscillating circuit and the ground.

10. The transponder of claim 7, wherein the at least one switchable inductive element is formed by at least one active circuit.

11. A method comprising:
    obtaining first data corresponding to a voltage across an oscillating circuit of an electromagnetic transponder tuned to a frequency, a capacitance and an inductance of the oscillating circuit being set to a first capacitance value and a first inductance value, respectively;
    obtaining second data corresponding to the voltage across the oscillating circuit tuned to the frequency, the capacitance and the inductance of the oscillating circuit being set to a second capacitance value and a second inductance value, respectively;
    evaluating a current coupling factor between the transponder and a terminal in accordance with one or more comparisons between a quantity and one or more respective thresholds, the quantity being derived from the second data and the first data; and operating the electromagnetic transponder in accordance with a result of the evaluating.

12. The method of claim 11, wherein:
the first data comprises a level of a D.C. voltage provided by rectifying the voltage across the oscillating circuit having the first capacitance and inductance values; and
the second data comprises a level of a D.C. voltage provided by rectifying the voltage across the oscillating circuit having the second capacitance and inductance values.

13. The method of claim 11, wherein evaluating the current coupling factor comprises:
performing the one or more comparisons between the quantity and the one or more respective thresholds; and
identifying a position of the current coupling factor with respect to an optimum coupling position in accordance with the one or more comparisons.

14. The method of claim 11, wherein the one or more thresholds are functions of the first inductance and the second inductance.

15. The method of claim 11, further comprising:
in a case where a ratio between the current coupling factor and the optimum coupling ranges between a first threshold and a second threshold, detuning the oscillating circuit.

16. An electromagnetic transponder comprising:
an oscillator configured to provide a signal in response to a magnetic field of a terminal;
a rectifier configured to rectify a voltage of the signal provided by the oscillator; and
a switchable inductive element and a switchable capacitive element connected in parallel,
wherein
an inductance and a capacitance of the oscillator are adjustable among a plurality of pairs of inductive and capacitive values which correspond to a tuning of the oscillating circuit to a same frequency; and
a processing unit programmed to:
obtain first data corresponding to a voltage across the oscillator, the oscillator being tuned to a frequency, the capacitance and the inductance of the oscillator being set to a first capacitance value and a first inductance value, respectively;
obtain second data corresponding to the voltage across the oscillator, the oscillator being tuned to the frequency, the capacitance and the inductance of the oscillator being set to a second capacitance value and a second inductance value, respectively;
evaluate a current coupling factor between the transponder and the terminal in accordance with one or more comparisons between a ratio and one or more respective thresholds, the ratio being between the second data and the first data; and
operate the electromagnetic transponder in accordance with a result of the evaluating.

17. The transponder of claim 16, wherein the oscillator comprises an inductive element and a capacitive element connected in parallel with the switchable inductive element and the switchable capacitive element.

18. The transponder of claim 16, wherein:
the oscillator comprises an inductive element and a capacitive element connected in parallel and connected to input terminals of the rectifier; and the switchable inductive element and the switchable capacitive element are connected to output terminals of the rectifier.

19. The transponder of claim 16, wherein:
the oscillator comprises an inductive element and a capacitive element connected in parallel and connected to input terminals of the rectifier;
the switchable inductive element and the switchable capacitive element are connected in parallel between a first terminal of the oscillator and a ground; and
the transponder further comprises a second switchable inductive element and a second switchable capacitive element connected in parallel between a second terminal of the oscillator and the ground.

20. The transponder of claim 16, wherein the switchable inductive element is formed by at least one active circuit.

21. An electromagnetic transponder comprising:
an oscillator configured to provide a signal in response to a magnetic field of a terminal;
means for adjusting an inductance and a capacitance of the oscillator among a plurality of pairs of inductive and capacitive values, wherein each of the plurality of pairs of inductive and capacitive values corresponds to a tuning of the oscillating circuit to a same frequency, wherein the means for adjusting an inductance and a capacitance of the oscillator comprises a switchable inductive element and a switchable capacitive element connected in parallel; and
a rectifier configured to rectify a voltage of the signal provided by the oscillator, and
a processor programmed to:
obtain first data corresponding to a voltage across the oscillator, the oscillator being tuned to the first frequency, the capacitance and the inductance of the oscillator being set to a first capacitance value and a first inductance value, respectively;
obtain second data corresponding to the voltage across the oscillator, the oscillator being tuned to the first frequency, the capacitance and the inductance of the oscillator being set to a second capacitance value and a second inductance value, respectively;
evaluate a current coupling factor between the transponder and the terminal in accordance with one or more comparisons between a ratio and one or more respective thresholds, the ratio being between the second data and the first data; and
operate the electromagnetic transponder in accordance with a result of the evaluating.

22. The transponder of claim 21, wherein the oscillator comprises an inductive element and a capacitive element connected in parallel and connected to input terminals of the rectifier.

23. An electronic system for wireless communication, comprising:
a terminal comprising a first oscillator capable of generating a magnetic field; and
an electromagnetic transponder comprising:
a second oscillator configured to provide a signal in response to the magnetic field,
a switchable inductive element and a switchable capacitive element connected in parallel, wherein an inductance and a capacitance of the second oscillator are adjustable among a plurality of pairs of inductive and capacitive values which correspond to a tuning of the second oscillating circuit to a same frequency,
a rectifier configured to rectify a voltage of the signal provided by the second oscillator, and a processing unit programmed to:
    obtain first data corresponding to a voltage across the second oscillator, the second oscillator being tuned to a frequency, the capacitance and the inductance of the second oscillator being set to a first capacitance value and a first inductance value, respectively;
    obtain second data corresponding to the voltage across the second oscillator, the second oscillator being tuned to the frequency, the capacitance and the inductance of the second oscillator being set to a second capacitance value and a second inductance value, respectively; and
    evaluate a current coupling factor between the transponder and the terminal in accordance with one or more comparisons between a ratio and one or more respective thresholds, the ratio being between the second data and the first data; and
operate the electromagnetic transponder in accordance with a result of the evaluating.

24. The system of claim 23, wherein the second oscillator comprises an inductive element and a capacitive element connected in parallel with the switchable inductive element and the switchable capacitive element.

25. The system of claim 23, wherein:
the second oscillator comprises an inductive element and a capacitive element connected in parallel and connected to input terminals of the rectifier; and
the switchable inductive element and the switchable capacitive element connected to output terminals of the rectifier.

26. The system of claim 23, wherein:
the second oscillator comprises an inductive element and a capacitive element connected in parallel and connected to input terminals of the rectifier;
the switchable inductive element and the switchable capacitive element are connected in parallel between a first terminal of the second oscillator and a ground; and
the transponder further comprises a second switchable inductive element and a second switchable capacitive element connected in parallel between a second terminal of the second oscillator and the ground.

27. The system of claim 23, wherein the terminal includes a regulating circuit and an antenna, and the regulating circuit is configured to regulate a phase of a signal of the antenna such that a phase relationship between the antenna signal and a reference signal is constant.

28. The system of claim 27, wherein the regulating circuit is further configured to regulate the phase of the antenna signal such that, in static operation, an imaginary part of an apparent impedance of the first oscillator is zero.

29. The method of claim 13, wherein the quantity is a ratio between the second data and the first data.

* * * * *

UNITED STATES PATENT AND TRADEMARK OFFICE
CERTIFICATE OF CORRECTION

| | | |
|---|---|---|
| PATENT NO. | : 8,395,485 B2 | Page 1 of 1 |
| APPLICATION NO. | : 12/815681 | |
| DATED | : March 12, 2013 | |
| INVENTOR(S) | : Luc Wuidart | |

It is certified that error appears in the above-identified patent and that said Letters Patent is hereby corrected as shown below:

Title Page should read

[73]  STMicroelectronics (Rousset) SAS,
      Rousset (FR)

Signed and Sealed this
Twenty-third Day of April, 2013

Teresa Stanek Rea
*Acting Director of the United States Patent and Trademark Office*